United States Patent [19]

Wesebaum et al.

[11] 4,008,118
[45] Feb. 15, 1977

[54] BUTT FUSION MACHINE

[75] Inventors: Paul E. Wesebaum, Elyria, Ohio; Wayne E. Cooper, Bartlesville, Okla.

[73] Assignee: Emerson Electric Co., St. Louis, Mo.

[22] Filed: Dec. 30, 1975

[21] Appl. No.: 645,436

[52] U.S. Cl. .............................. 156/499; 29/282; 156/258; 156/304

[51] Int. Cl.² ............... B32B 31/18; B32B 31/20; B32B 35/00

[58] Field of Search ............... 156/304, 499, 258; 90/14, 15, 15.1, 21 R, 21 D, 21.5; 248/49, 62, 74 R; 29/282

[56] References Cited

UNITED STATES PATENTS

| | | | |
|---|---|---|---|
| 3,253,972 | 5/1966 | Huddleston | 156/499 |
| 3,552,265 | 1/1971 | Lucas | 90/21 |
| 3,729,360 | 4/1973 | McElroy | 156/499 |
| 3,789,493 | 2/1974 | Province | 29/282 |
| 3,846,208 | 11/1974 | McElroy | 156/499 |

Primary Examiner—Caleb Weston
Attorney, Agent, or Firm—Polster and Polster

[57] ABSTRACT

In a butt fusion machine for fusing two sections of large diameter plastic pipe wherein said sections are clamped in axially aligned clamps one of which is fixed against linear movement and one is relatively linearly movable, a generally L-shaped frame is provided on which said clamps are mounted, part of the frame defining a reference plane. The clamps are mounted to open at an acute angle to the reference plane. The movable clamp is moved by a hydraulic system, which includes an accumulator. A carriage mounted on the upright portion of the frame for movement parallel to the axis of the clamps carries hingedly mounted on it a facer and a heater. Both the facer and the heater are mounted on an axis radially outboard of and substantially parallel to the axis of the clamps, and are so arranged as to be selectively swingable between a position intermediate the clamps and a position totally outboard of them. Means are provided for maintaining the face and heater selectively and independently in either of said positions.

7 Claims, 5 Drawing Figures

BUTT FUSION MACHINE

BACKGROUND OF THE INVENTION

In butt fusing machines in use heretofore, clamps, one of which is movable relative to the other, grip ends of two pipe sections to be fused. A facer is placed between the two pipe ends, and the ends of the pipe faced off in substantial parallelism. The facer is removed, and a heater is placed intermediate the butt ends of the sections and the butt ends are brought into contact with the heater by means of the movable clamp, until the end surfaces are softened, the sections are pulled apart slightly, the heater removed, and the softened ends brought together by the action of the movable clamp. The basic process is illustrated in U.S. Pat. Nos. 3,013,925 and 3,552,265, in which the steps of moving the pipe sections and inserting and removing facer and heater are performed manually. Machines are presently in use in which those steps are performed hydraulically, cf. Manufacturing, Inc. Bulletin No. 5761.

The clamps have been made up of semi-cylindrical shell members which have most commonly been oriented so that the pipe-receiving mouth of the lower shell is substantially horizontal, although canted shells, in which the mouth is set at an angle from the horizontal, have been known.

One of the objects of this invention is to provide a butt fusion machine, particularly useful for large diameter plastic pipe, in which the steps of facing, heating and butting of the pipe and lining of the shells are all simplified and faster as compared with the steps required in butt fusion machines used heretofore.

Another object is to provide such a machine in which provision is made for minimizing the sensitivity of the hydraulic valve setting when the pipe is butted for fusing.

Other objects will become apparent to those skilled in the art in the light of the following description and accompanying drawings.

SUMMARY OF THE INVENTION

In a butt fusion machine for fusing two sections of large diameter plastic pipe wherein the sections are clamped between upper and lower semi-cylindrical shells hinged for swinging relative to one another to form axially aligned clamps, one of which clamps is fixed against linear movement and one is relatively linearly movable, a frame, generally L-shaped in end elevation is provided, a lower section of which defines a base reference plane. Axially aligned clamps are mounted on the frame, each of the clamps having a lower semi-cylindrical shell having a mouth with one part more remote from the reference plane than another part, whereby the mouth lies in a plane at an acute angle to the reference plane. One of the clamps is fixedly mounted on the frame against linear movement. The other is movably mounted on the frame and is moved toward and away from the fixedly mounted clamp by hydraulic means mounted on the frame. A carriage is mounted on an upright portion of the frame for movement parallel to the axis of the clamps. A facer and a heater are hingedly mounted on the carriage on axes radially outboard of and substantially parallel to the axis of the clamps for selective swinging between a position intermediate the clamps and a position totally outboard of them. Means are provided for moving the heater and facer between, and for maintaining the heater and facer selectively and independently in, either of the positions. An accumulator can be provided in the hydraulic system for minimizing the sensitivity required in setting the pressure controls when the pipe moves to butting, fusing position.

DESCRIPTION OF THE PREFERRED EMBODIMENT

Figure 1:
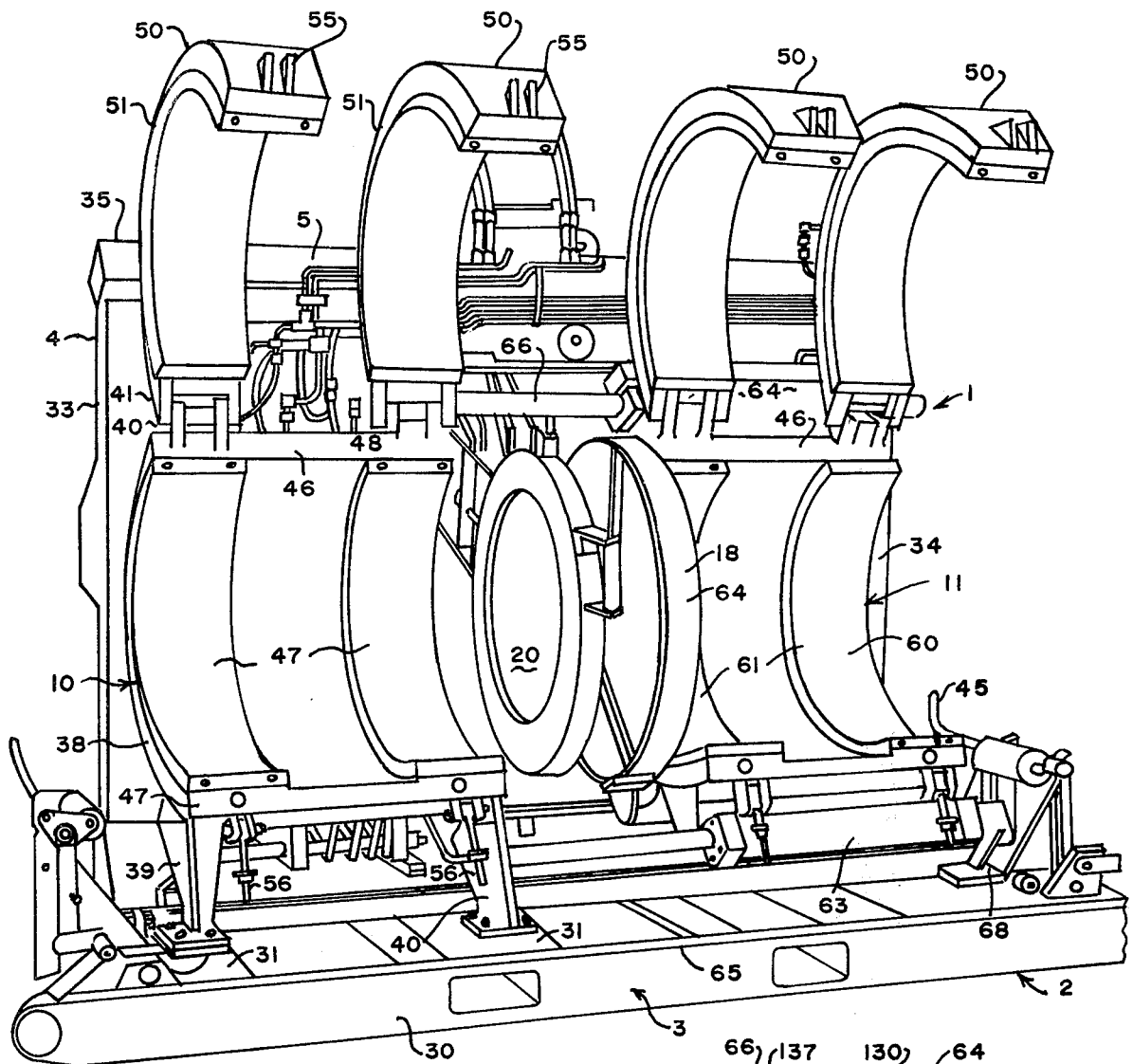
FIG. 1 is a view in perspective of one illustrative embodiment of the butt fusion machine of this invention.

Referring now to the drawing for one illustrative embodiment of this invention, and particularly to FIG. 1, reference numeral 1 indicates the complete machine which includes a roughly L-shaped frame 2 with a substantially horizontal base section 3 and an upright section 4. A track 5 is carried by and is part of the upright section. The frame carries various elements of a hydraulic system 6, indicated diagrammatically in FIG. 5, which includes an electrically driven pump 7 shown particularly in FIG. 4, and an accumulator 8.

Two pipe-holding clamps are mounted on the frame, a fixed clamp 10 and a linearly movable clamp 11.

The clamps 10 and 11 are axially aligned, and the clamp 11 is mounted to permit its movement between a position substantially in abuttment with the clamp 10 and a retracted position substantially removed from clamp 10.

A carriage assembly 15 is mounted for movement in a direction parallel with the axis of the clamps, on the track 5. A facer 18 and a heater 20 are mounted on the carriage for movement with the carriage and for swinging movement in planes perpendicular to the axis of the clamps independently of one another, and selectively, between a position intermediate the clamps 10 and 11 and a position entirely outboard of the clamps.

Figure 4:
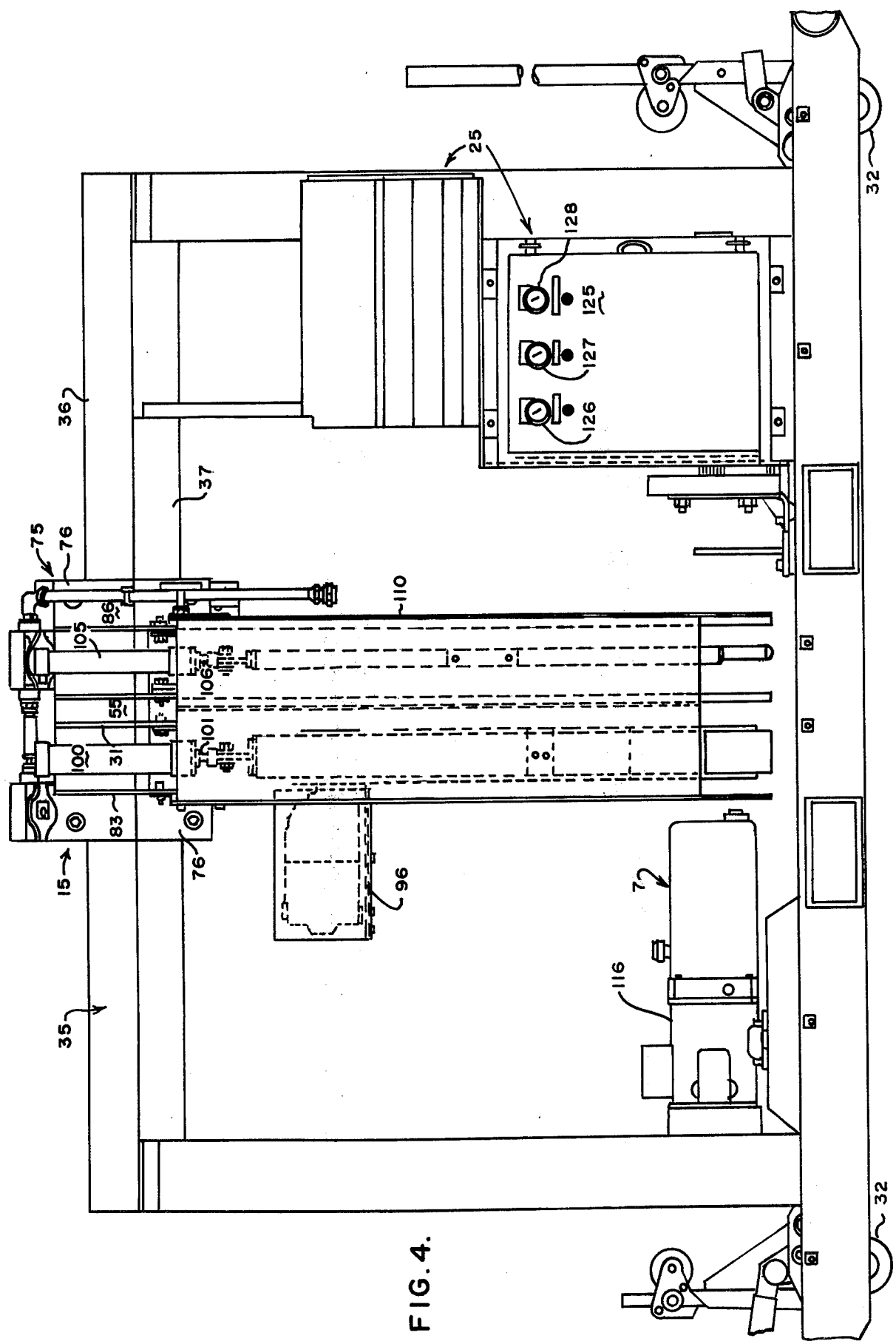
FIG. 4 is a view in rear elevation of the machine shown in FIG. 1.

In the embodiment shown, the electrical and hydraulic systems of the machine are operated from a control center 25, mounted on the side of the frame away from the clamps, as shown in FIG. 4.

Figure 3:
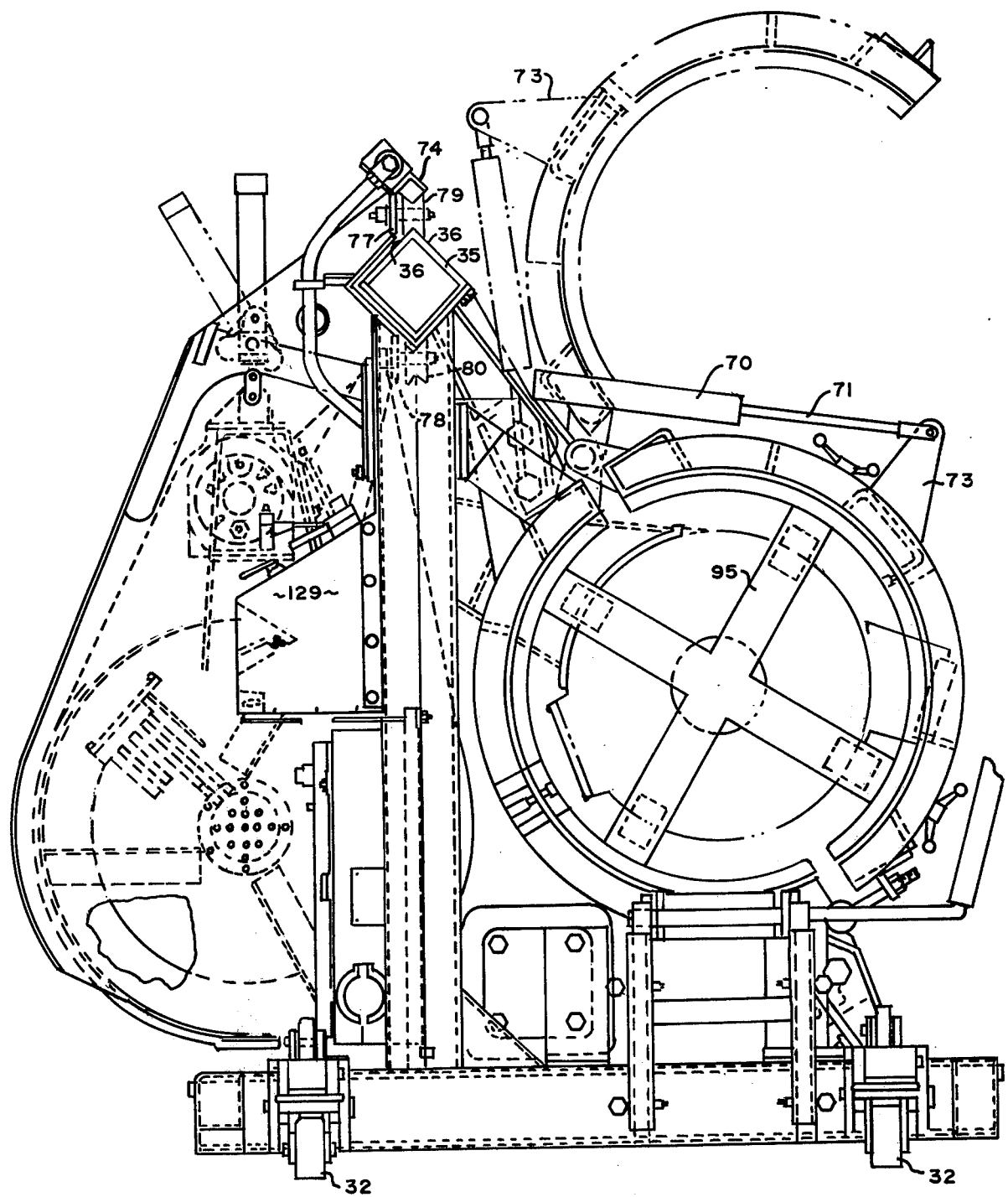
FIG. 3 is a view in end elevation of the left end of the machine as viewed in FIGS. 1 and 2.

The base section 3 of the frame 2 is shown in FIG. 1 as having a sled-like configuration, and in FIGS. 3 and 4 as equipped with casters 32, which can be removed or retracted. In either event, the base section includes heavy side beams 30 and cross beams or channels 31. The upright section 4 of the frame includes end stanchions 33 and 34 welded or bolted to the base section, and a square beam 35, set on edge and welded to stanchions 33 and 34 to provide upper double track surfaces 36 and lower double track surfaces 37.

The clamps 10 and 11 are made up of semi-cylindrical shells. A lower shell 38 of the fixed clamp 10 is mounted on heavy legs 39 and 40 bolted to cross beams 31, and on brackets 42 and 43, bolted to the stanchion 33 and a face of beam 35, respectively, as shown particularly in FIG. 2. The lower shell 38 has a mouth defined by a lower diametrical face 45 and an upper diametrical face 46. In this embodiment, two liners 47, to accommodate pipe of a particular diameter, are removably mounted on the shell 38. In the embodiment shown, lower hinge knuckles 48 are made integral with the upper part of the shell 38, and cooperate with upper hinge knuckles 49 made integral with two upper shells 50, which are hingedly mounted on the lower shell 38 by means of pintles 52 through the knuckles 48 and 49, which pintles are outboard of the mouth of the lower shell, and parallel to the axis of the clamps. The upper shells 50 are provided with liners 51 corresponding to the liners 47.

Latching lugs 55 integral with or welded to the outside surface of the upper shells cooperate with latching bolts 56, hingedly mounted on the lower shell 38.

The movable clamp 11 has a lower shell 60 equipped with liners 61. The shell 60 carries upper shells 50 which are identical with the upper shells 50 of the clamp 10, and are mounted in the same way.

The movable clamp 11 is mounted on hydraulic mechanisms similar to that shown and described in Province, U.S. Pat. No. 3,789,493. In the machine shown, however, a lower hydraulic cylinder 63 is mounted on the lower shell 60 near, but below the lower diametrical face 45, and an upper hydraulic cylinder 64 is mounted on the lower shell 60 near but below the upper diametrical face 46. The lower cylinder 63 is in turn supported by a lower piston rod 65, and the upper cylinder 64 is supported by an upper piston rod 66. The lower piston rod 65 is mounted on and carried by a support bracket 68 at one end, and by the heavy leg 40 at the other. The upper piston rod 66 is supported at one end by a bracket secured to the stanchion 34, and at the other by the bracket 43. The piston rods 65 and 66 are parallel with one another and with the axis of the clamps.

The upper shells of both clamps are moved into and out of clamping position by means of shell hydraulic cylinders 70 acting through pistons and piston rods 71. The cylinders in the embodiment shown are pivotally mounted on mounting brackets 72 carried by the lower shells. An outwardly projecting triangular plate 73 on each of the upper shells is connected by a clevis to the piston rod 71, as shown in FIGS. 2 and 3.

Figure 2:
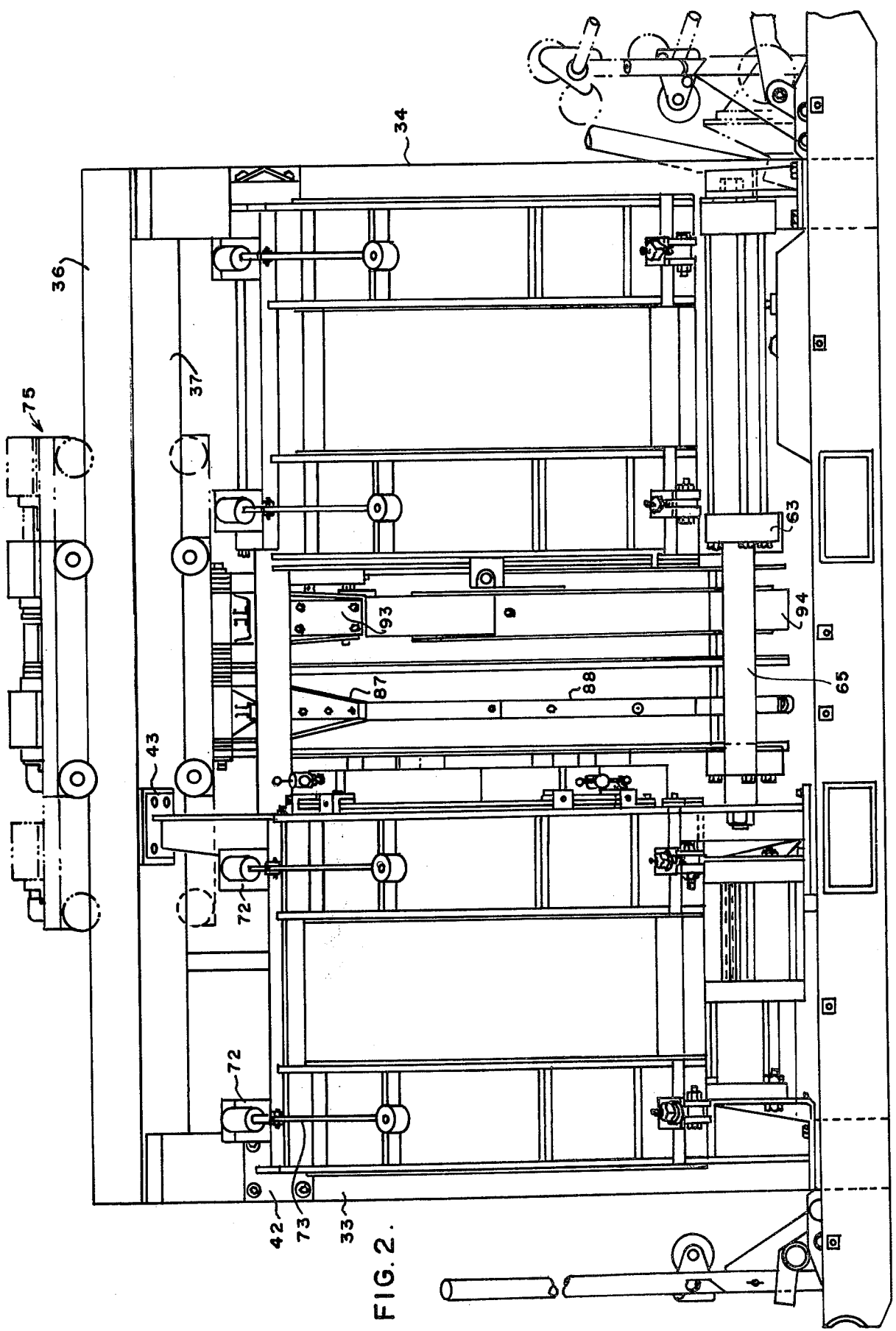
FIG. 2 is a view in front elevation in the direction toward the machine as it is shown in FIG. 1.

Referring now particularly to FIGS. 2, 3 and 4, the carriage assembly 15 is made up of a carriage frame 75, with a side plate 76 along the upper edge of which are mounting angles 74, as shown clearly in FIGS. 3 and 4. The side plate is bent to conform in outline with the beam 35, to conserve space, as shown particularly in FIG. 3, leaving a vertical upper spine 77 and a vertical parallel lower spine 78 all reinforced at the ends by straps welded to the outer surface of the side plate on and at which upper wheels 79 and lower wheels 80 respectively are mounted. There are two upper wheels 79 and two lower wheels 80, positioned at opposite ends of the carriage frame, as shown in FIG. 2. Each of the upper wheels 79 and lower wheels 80 is grooved in the manner of a V sheave, and straddles the upper and lower arrises of the beam 35, as shown in FIG. 3, to run on the track surfaces 36 and 37 respectively. The axles upon which the wheels 79 and 80 are mounted are arranged so that they can be moved toward and away from one another, to ensure that no undesired play is permitted in the carriage.

In the embodiment shown, four support plates 83, 84, 85 and 86 are welded to the side plate 76 of the carriage, and project at right angles to it and parallel to one another. A heater bracket 87 is hingedly mounted on and between plates 85 and 86. The heater bracket 87 supports a heater frame within which an electrically energized heater ring 88 of the heater assembly 20 is mounted.

A facer bracket 93 is hingedly mounted on and between support plates 83 and 84. The facer bracket supports a facer frame 94, in which facer blades 95 are revolvably mounted to be rotated by a facer motor 96, mounted on the facer frame 94.

At a point outboard from the hinge axis of the facer bracket 93, a facer hydraulic cylinder is pivotally mounted on and between the support plates 83 and 84. A piston rod 101 from the facer cylinder 100 is clevis mounted to a plate secured to the facer frame at a point also outboardly offset from the pivot axis of the facer bracket.

Similarly, a heater hydraulic cylinder 105 is pivotally mounted between support plates 85 and 86 at a point outboard of the pivot axis of the heater bracket, and is connected to the heater frame by means of a stop rod 106 clevis mounted to a plate on the heater ring frame.

The facer 18 and the heater 20 are surrounded on the side of the frame opposite the clamps, by a guard 110.

The various hydraulic cylinders are operated by means of the hydraulic pump 7, driven by an electric motor 116, through suitable hydraulic conduit, some of which must be flexible to accommodate movement of the hydraulic cylinders, such as those on the carriage 15. Controls for the electrical components, and in particular the facer motor, the heater ring, and the hydraulic pump motor, are mounted in an electrical control box 125, a panel board on which carries a facer switch knob 126, a heater switch knob 127 and a hydraulic motor switch knob 128. The valves by which the various hydraulic cylinders are controlled are mounted in a hydraulic control box 129, from which suitable control handles extend.

Figure 5:
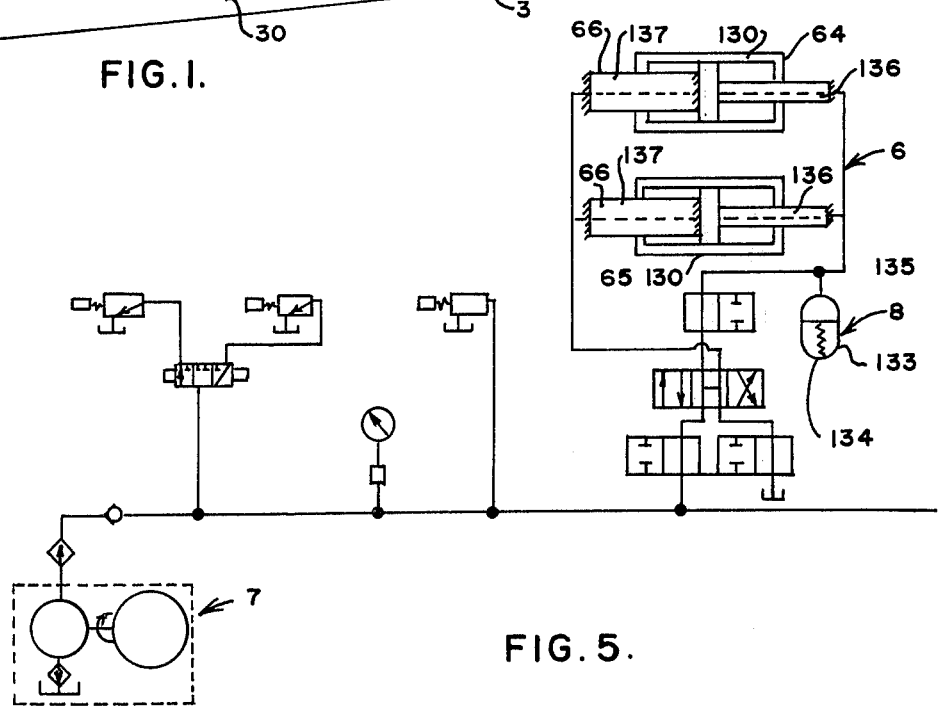
FIG. 5 is a diagrammatic view of the hydraulic system of the machine.

Referring now to FIG. 5, it will be observed that the piston rods 65 and 66 of the hydraulic cylinders 63 and 64 have a uniform small diameter section 136 on one side of a piston 130, and a uniformly larger diameter section 137 on the other side of the piston 130. In the hydraulic line between the cylinders 63 and 64, on the side of the piston 130 from which the piston rod sections 136 extend, is the accumulator 8. The accumulator 8 includes an accumulator tank 133, a spring 134, and a piston which may take the form of a diaphragm 135. The cylinders 63 and 64 and piston rods 65 and 66 shown somewhat diagrammatically in FIG. 5 are oriented the same way as the cylinders 63 and 64 in FIG. 1. Thus it can be seen that if the rate of admission of hydraulic fluid to the two sides of the cylinders is uniform, when the fluid is admitted to the side on which the section 136 of the piston rod is, the cylinder will move more slowly and with greater force in a direction to move the clamp 11 toward the clamp 10, then it will when hydraulic fluid is admitted to the other chamber to cause the cylinder to move in the opposite direction.

In the operation of the machine of this invention, the clamps 10 and 11 are first fully retracted with respect to one another and are opened, and the facing ends of two sections of pipe to be joined are placed in clamps 10 and 11, with a section of each end to be fused projecting from the clamps toward one another. The shells 50 are then moved into position by the hydraulic cylinders and piston rods 70 and 71, and locked by means of the latching lugs 55 and latching bolts 56. During this time, the facer 18 and heater 20 are out of the way, within the confines of the guard 110 and completely outboard of the clamps 10 and 11.

The facer 18 is then swung into position intermediate the ends of the pipe, and the motor 96 energized to start the revolving of the blades. The hydraulic controls for the cylinders 63 and 64 are actuated to cause the clamp 11 to move toward the clamp 10. The facer 18 is moved by the bearing of the end of the pipe in the clamp 11, which causes the carriage 15 to move along the track 5, until the facer is firmly against both ends of the sections of pipe and the blades 95 are dressing the two ends of the pipe to smoothness and parallelism. The clamp control is thereupon reversed, moving the clamp 11 away from the clamp 10 far enough to permit the facer 18 to be swung by its cylinder 100 away from and outside the ambit of the clamps.

The heater 20 is then swung intermediate the dressed ends of the pipe sections, the hydraulic control for the clamp 11 is moved to cause the clamp 11 to bring the end of the pipe within that clamp against the heater and thence to move the heater into contact with the dressed end of the pipe in clamp 10, until the dressed ends have softened to fusing condition. Thereupon the clamp 11 is moved away from the clamp 10 enough to permit the heater 20 to be swung out of the way, and then the clamp 11 is moved toward the clamp 10 until the softened faces of the pipe abut with sufficient force to permit effective fusion of the two ends.

The pipes for which the machine of this invention is intended to be used are large and heavy, for example 24" in diameter and four pounds per linear foot, and the section being moved is generally on the order of 40 feet long, so that the momentum of the pipe is substantial. The provision of the accumulator 8 serves automatically to absorb the kinetic energy of the fluid and minimize the sensitivity required when setting the pressure controls. This has been found to produce a more uniformly satisfactory fusion of pipe of various sizes.

Numerous variations in the construction of the machine of this invention within the scope of the appended claims will occur to those skilled in the art in the light of the foregoing disclosure. Merely by way of example, the hydraulic system by which the movable clamp is moved can be given a differential speed and force by other arrangements of the hydraulic cylinder to provide an effective capacity in one cavity greater than in the other. In the embodiment described, the double track surfaces 36 and 37 were provided by setting the square box beam on edge. However, angles or sloped plates can be welded to horizontal surfaces of the box beam, an I beam or the like which in turn can be welded or bolted to the end stanchions in such an orientation that the angles or sloped plates furnish the bearing surfaces.

The plates or angles providing the bearing surface can be trapezoidal in end view, but in any event, it is preferred that the bearing surfaces be sloped divergently away from wheels which run on them. The various hydraulic systems can be replaced by mechanical systems or by hydraulic-mechanical systems utilizing cables and pulleys, screws, worms or racks and pinions, for example. The shells, facer and heater can even be moved manually, although one of the virtues of the carriage arrangement is that the means for moving the facer and heater are mounted to be carried by the carriage. The details of the carriage construction, the hinging of various elements and the like can be varied, so long as the carriage is positioned above the shell hinge axis and the shells are canted, which latter facilitates replacement of the liners among other things. These variations are merely illustrative.

Having thus described the invention, what is claimed and desired to be secured by Letters Patent is:

1. In a butt fusion machine for fusing two sections of large diameter plastic pipe wherein one of said sections is clamped between upper and lower semicylindrical shells hinged for swinging relative to one another to form a clamp which is fixed against linear movement and one of said sections is clamped between upper and lower semi-cylindrical shells hinged for swinging relative to one another to form a clamp which is linearly movable relative to said other clamp, said clamps being axially aligned and spaced from one another, said machine being adapted to accommodate a facer and heater successively between said clamps and between butt ends of the sections of pipe held therein, the improvement comprising an L-shaped frame having a base section defining a base reference plane, and an upright section; two, axially aligned, spaced clamps mounted on said frame, each of said clamps comprising a lower semi-cylindrical shell having a mouth with one part more remote from said reference plane than another part, whereby the said mouth lies in a plane at an acute angle to said reference plane, hinge means at said part of said mouth more remote from said reference plane, and at least one swinging upper semi-cylindrical shell connected to said hinge means, one of said clamps being fixedly mounted on said frame against linear movement, the other of said clamps being movably mounted on said frame for linear movement toward and away from the fixedly mounted clamp; a carriage mounted on the upright section of said frame above the hinge axis of the upper and lower hinge shells for movement parallel to the axis of said clamps; a facer hingedly mounted on said carriage on an axis radially outboard of and substantially parallel to the axis of said clamps for selective swinging between a position intermediate said clamps and a position totally outboard of them; and a heater hingedly mounted on said carriage on an axis radially outboard of and substantially parallel to the axis of said clamps for selective swinging between a position intermediate said clamps and a position totally outboard of them independently of said facer.

2. The improvement of claim 1 wherein the upright portion of said frame carries a track, and said carriage includes wheels which run on said track.

3. The improvement of claim 2 wherein wheels are spaced transversely of the frame and said track includes oppositely sloped bearing surfaces upon which said wheels run, said bearing surfaces sloping divergently in a direction away from said wheels.

4. The improvement of claim 3 wherein the track is provided by a square beam extending the length of the upright section of the frame and set on edge, and the wheels of said carriage straddle top and bottom arrises of said beam.

5. The improvement of claim 1 wherein means for swinging said facer and heater between said positions are carried by said carriage.

6. The improvement of claim 5 wherein the said means for swinging said facer and heater include hydraulic means.

7. The improvement of claim 1 including hydraulic means for moving the movably mounted clamp, and said hydraulic means includes an accumulator.

* * * * *